United States Patent
Amm et al.

(10) Patent No.: US 9,851,813 B2
(45) Date of Patent: *Dec. 26, 2017

(54) FORCE SENSING FOR FINE TRACKING CONTROL OF MOUSE CURSOR

(75) Inventors: David T. Amm, Sunnyvale, CA (US); Omar S. Leung, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 1783 days.

This patent is subject to a terminal disclaimer.

(21) Appl. No.: 12/233,502

(22) Filed: Sep. 18, 2008

(65) Prior Publication Data

US 2010/0066670 A1    Mar. 18, 2010

(51) Int. Cl.
*G06F 3/033* (2013.01)
*G09G 5/08* (2006.01)
*G09G 5/00* (2006.01)
*G06F 3/0354* (2013.01)

(52) U.S. Cl.
CPC .............................. *G06F 3/03543* (2013.01)

(58) Field of Classification Search
USPC ................................................. 345/156–157
See application file for complete search history.

(56) References Cited

U.S. PATENT DOCUMENTS

| | | | |
|---|---|---|---|
| 5,191,641 A | 3/1993 | Yamamoto et al. | |
| 5,195,179 A | 3/1993 | Tokunaga | |
| 5,508,719 A * | 4/1996 | Gervais | 345/157 |
| 5,999,169 A * | 12/1999 | Lee | 345/163 |
| 6,489,948 B1 * | 12/2002 | Lau | 345/163 |
| 6,894,678 B2 | 5/2005 | Rosenberg et al. | |
| 6,975,302 B1 * | 12/2005 | Ausbeck, Jr. | 345/161 |
| 7,154,477 B1 * | 12/2006 | Hotelling et al. | 345/166 |
| 2004/0017355 A1 * | 1/2004 | Shim | 345/157 |
| 2005/0110745 A1 * | 5/2005 | Rutledge et al. | 345/156 |
| 2005/0134556 A1 * | 6/2005 | VanWiggeren et al. | 345/156 |
| 2007/0080940 A1 * | 4/2007 | Aoki et al. | 345/158 |
| 2007/0290998 A1 * | 12/2007 | Choi et al. | 345/158 |
| 2010/0013768 A1 * | 1/2010 | Leung | 345/163 |
| 2010/0066669 A1 * | 3/2010 | Amm et al. | 345/157 |

* cited by examiner

*Primary Examiner* — Lin Li
(74) *Attorney, Agent, or Firm* — Brownstein Hyatt Farber Schreck, LLP

(57) ABSTRACT

Systems and methods for controlling a navigational object (e.g., a cursor) using an input device are disclosed herein. A system in accordance with one embodiment includes a motion-based input device adapted to move relative to a surface. The input device has one or more force sensors capable of detecting forces acting upon the input device. The system may then move a navigational object displayed on a receiving device in relatively small increments or relatively large increments, depending upon the detected forces acting upon the input device.

35 Claims, 6 Drawing Sheets

FORCE SENSING FOR FINE TRACKING CONTROL OF MOUSE CURSOR

FIELD OF THE INVENTION

The invention relates to input devices for computing systems, and more particularly, to methods and apparatuses for fine control of navigational objects, such as a cursors.

BACKGROUND OF THE INVENTION

An input device can be manipulated by a user to generate input data in a computer system. Typically, an input device is positioned on a surface and moved relative to that surface, but other forms of input devices operating in different fashions are also available. The operations performed on an input device generally correspond to moving a navigational object (e.g., a cursor) and/or making selections on a display screen. There are many kinds of electronic input devices, such as buttons or keys, pens, digitizing pads, game controllers, trackballs, touch screens, touch pads, mice, and the like. A "mouse" is a common type of input device that functions as a pointing device for a computer by detecting motion imparted by a user. The mouse's motion is typically translated into motion of a navigational object (e.g., cursor) on a graphical user interface (GUI) provided on a display screen. A mouse generally comprises a small case, held in a user's hand, with one or more input buttons. Additionally, a mouse may have other elements, such as a scroll wheel, that allow a user to perform enhanced operations.

When tracking the motion of an electronic input device, there can be a wide range of motions from large coarse motions to small fine motions. For example, a user may perform a large, coarse motion with the input device to move a navigational object from one side of a graphical display to another side of the graphical display. In contrast, a user may perform a small, fine motion with the input device to move the navigational object a relatively small number pixels (e.g., 1 to 100 pixels). A user may want to move a navigational object a relatively small number of pixels when homing in on a small target area, such as a space between two adjacent characters in a text file. However, many conventional mouse-type input devices slip or jerk when the user attempts to move the input device in small increments due to static/kinetic friction transitions. This can cause unstable control of the navigational object.

Accordingly, fine control of a navigational object using an electronic input device can be a difficult challenge when the input device is also used for coarse cursor control.

SUMMARY OF THE INVENTION

Various aspects of the present invention relate systems and methods for controlling a navigational object using an input device. A system in accordance with one embodiment includes a motion-based input device having a force detection module operable to detect a lateral force applied to the input device. The system further includes a processor coupled to the force detection module. The processor is operable to generate navigational object movement information based on the detected lateral force. The navigational object movement information may include moving the navigational object in relatively small increments or in relatively large increments.

In accordance with a further embodiment, a computer readable medium capable of storing computer executable instructions is provided. When executed by a computer, the computer readable medium includes code for detecting a lateral force applied to the input device and detecting a motion of the input device relative to a surface. In addition, the computer readable medium includes code for calculating a change in position of the navigational object based on a detected lateral force contribution and a detected motion contribution.

In one embodiment, a method for controlling movement of a navigational object displayed on a user graphical interface is provided. The method includes measuring a lateral force applied to an input device and estimating a change in magnitude of the applied lateral force. The method also generates a control signal based on the estimated change in magnitude of the applied lateral force, wherein the control signal is indicative of a change in position of a navigational object on a graphical display.

Certain embodiments of the invention have other aspects in addition to or in place of those mentioned or obvious from the above. The aspects will become apparent to those skilled in the art from a reading of the following detailed description when taken with reference to the accompanying drawings.

BRIEF DESCRIPTION OF THE DRAWINGS

The following drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF EXEMPLARY EMBODIMENTS

In the following description of exemplary embodiments, reference is made to the accompanying drawings which form a part hereof, and in which it is shown by way of illustration specific embodiments in which the invention can be practiced. It is to be understood that other embodiments can be used and structural changes can be made without departing from the scope of the invention.

In accordance with various embodiments, a motion-based input device can include one or more force sensors capable of detecting forces acting upon the input device and generating a signal representative of the detected forces. A system can then initiate (e.g., trigger) one or more events based on the signal.

As used herein, the term "event" can refer to any function or process performed by a computer system in response to user input. An event need not be a function traditionally initiated by a user using a motion-based input device, but can also include functions initiated by a user using other types of input devices, including keyboards, touch pads, switches, buttons, dials or any other electrical, mechanical and/or optical mechanism that generates input data in response to a user input. A few non-limiting examples of an event can include moving a cursor displayed on a graphical user interface, making a selection indication (e.g., similar to depressing a selection button on a mouse, for example), changing a mode of operation, turning volume up or down, changing channels, paging back and forth in a software application, initiating a startup or wakeup sequence of a receiving device or the input device, and increasing a data collection rate to decrease lag.

As used herein, "motion-based input device" can refer to an input device that detects multi-dimensional motion of the input device relative to a surface. Motion-based input devices can utilize a variety of sensors for detecting movement of the input device relative to a surface and generate an input signal indicating information pertaining to the detected movement. Non-limiting examples of motion-based input devices include electro-mechanical mice (also known as "ball mice"), and optical mice.

Figure 1:
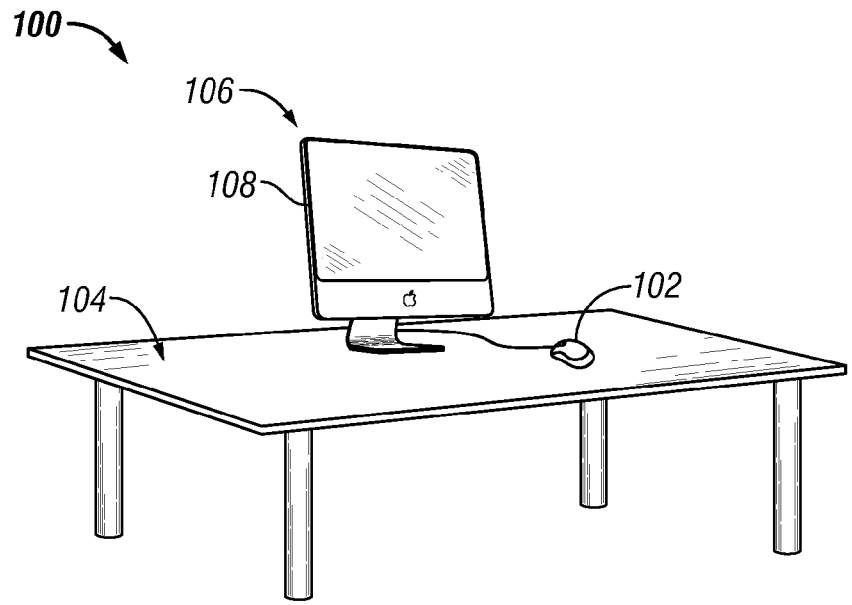
FIG. 1 illustrates an exemplary computing system using an input device according to various embodiments of this invention.

FIG. 1 illustrates a typical environment or system 100 in which a motion-based input device 102 in accordance with one embodiment may be used. The input device 102 can be positioned upon a surface 104 such as a desk or a tabletop. A user can move the input device 102 relative to the surface 104 to generate output signals indicative of the movement of the input device.

Note that in FIG. 1, the surface 104 is depicted as being flat or substantially flat. However, this is not strictly necessary according to other embodiments. Also note that the surface 104 need not necessarily be situated beneath the input device 102. For example, the surface 104 may be tilted, situated above the input device 102, or vertically oriented. Also note that multiple surfaces 104 can be utilized.

A receiving device 106 can be adapted to receive input signals generated by the input device 102. As used herein, the terms "receiving device" and "receiver" include without limitation video game consoles, set-top boxes, televisions, personal computers (whether desktop, laptop, or otherwise), digital video recorders, communications equipment, terminals, and display devices. In accordance with various embodiments, the receiving device 106 can comprise at least one interface adapted to receive the input signals transmitted from the input device 102. The input device 102 can be physically coupled to the receiving device via one or more communication links (such as via a serial bus cable), or the input device 102 can be adapted to wirelessly communicate with the receiving device 106.

A display device 108 in communication with the receiving device 106 can be adapted to display a navigational object upon its display screen (for example, a pointer, cursor, selector box, or other such indicator). During operation, when the user manipulates the input device 102 relative to the surface 104, the input signals generated by the input device are received at the receiving device 106 and the navigational object responds according to the user's input. As used herein, the term "display device" can include any type of device adapted to display information, including without limitation cathode ray tube displays (CRTs), liquid crystal displays (LCDs), thin film transistor displays (TFTs), digital light processor displays (DLPs), plasma displays, light emitting diodes (LEDs) or diode arrays, incandescent devices, and fluorescent devices. Display devices may also include less dynamic devices such as printers, e-ink devices, and other similar structures.

Figure 2:
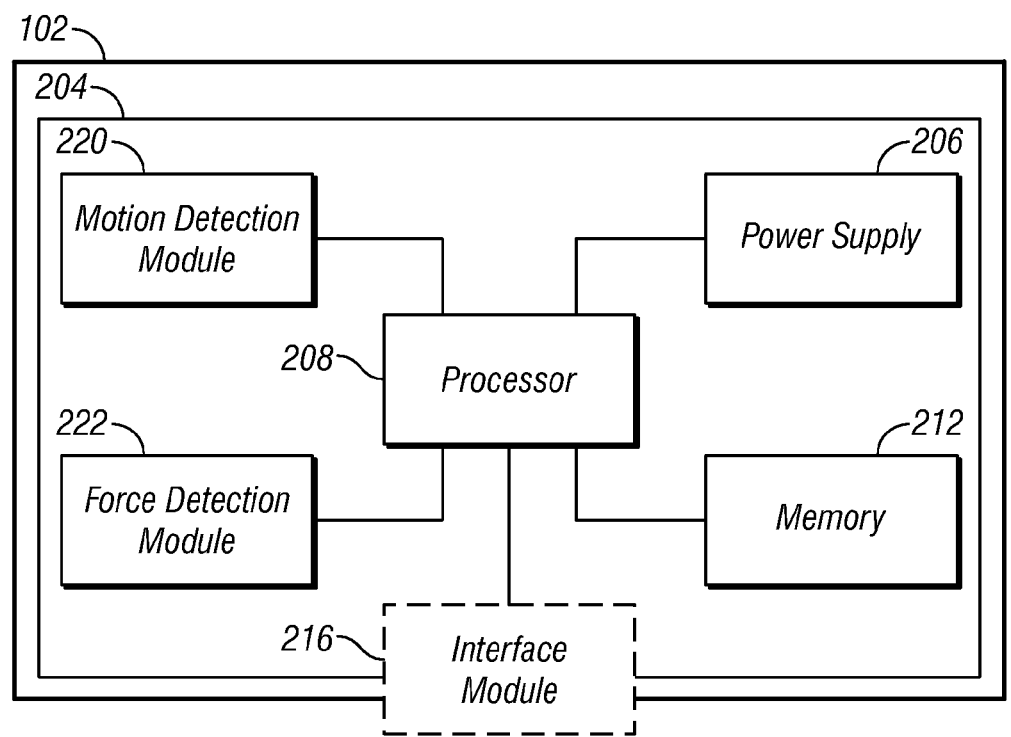
FIG. 2 is a system diagram of a modular arrangement of an input device according to various embodiments of this invention.

FIG. 2 is a system diagram of a modular arrangement of the input device 102 according to one embodiment of the present invention. The input device 102 includes a printed circuit board 204 comprising electrical leads that enable various modules to communicate with other coupled modules.

A power supply 206 provides a source of power to modules electrically coupled to the printed circuit board 204. In some embodiments, power is supplied externally from one or more conductive wires, for example, through the use of a power cable or a serial bus cable. In other embodiments, a battery may be used as a source of power.

A memory 212 comprises any type of module adapted to enable digital information to be stored, retained, and retrieved. Additionally, the memory 212 may comprise any combination of volatile and non-volatile storage devices, including without limitation RAM, DRAM, SRAM, ROM, and/or flash memory. Note also that the memory 212 may be organized in any number of architectural configurations by the use of registers, memory caches, data buffers, main memory, mass storage, and/or removable media, for example.

One or more processors 208 can be adapted to execute sequences of instructions by loading and storing data to the memory 212. Possible instructions include, without limitation, instructions for data conversions, formatting operations, communication instructions, and/or storage and retrieval operations. Additionally, the processors 208 may comprise any type of digital processing devices including, for example, reduced instruction set computer processors, general-purpose processors, microprocessors, digital signal processors, gate arrays, programmable logic devices, reconfigurable compute fabrics, array processors, and/or application-specific integrated circuits. Note also that the processors 208 may be contained on a single unitary integrated circuit (IC) die or distributed across multiple components.

Interface module 216 enables data to be transmitted and/or received over one or more communication networks. The data can be transmitted or received wirelessly or through the use of wires. In one embodiment, data transmitted to a receiving device is first packetized and processed according to one or more standardized network protocols. In one embodiment, the interface module 216 comprises a plurality of network layers such that each layer provides services to the layer above it and receives services from the layer below it. The interface module 216 may accommodate any wired or wireless protocol including, without limitation, USB, FireWire, Ethernet, Gigabit Ethernet, MoCA, radio frequency tuners, modems, WiFi, Blutooth, WiMax, and/or Infrared Data Association.

A motion detection module 220 comprises sensors and logic adapted to detect and/or measure motion parameters, such as acceleration, speed, velocity and/or position of the input device 102 at a specific instant in time, or alternatively, over a period of time. In accordance with various embodiments, the motion detection sensors can be an optical sensor, an electro-mechanical sensor, or any other sensor used in a motion-based input device capable of detecting motion of the input device 102.

A force detection module 222 can include sensors and logic adapted to detect forces acting upon the input device 102 during an instant in time, or alternatively, over a period of time. In accordance with some embodiments, the force detection module can include one or more force detection sensors operable to detect external forces acting upon the input device 102. In some embodiments, the force detection module 220 can detect forces acting upon the input device 102 in one dimension (e.g., an x-dimension), in other embodiments the force detection module 222 can sense forces acting upon the input device 102 in two dimensions (e.g., x and y dimensions), and in further embodiments the force detection module 222 can detect forces acting upon the input device 102 in three dimensions (e.g., x, y and z dimensions).

As mentioned above, the input device 102 can include one or more force sensors. In some embodiments, a three-component force sensor can detect the forces exerted on the input device in three dimensions (e.g., x, y and z dimensions). Suitable three-component force sensors include Kistler 3-Component Force Sensors, models 9167A, 9168A, 916AB, or 9168AB, offered by Kistler North America located in Amherst, N.Y., USA. In other embodiments, separate force sensors can be used to detect the forces exerted on the input device 102.

Figure 3:
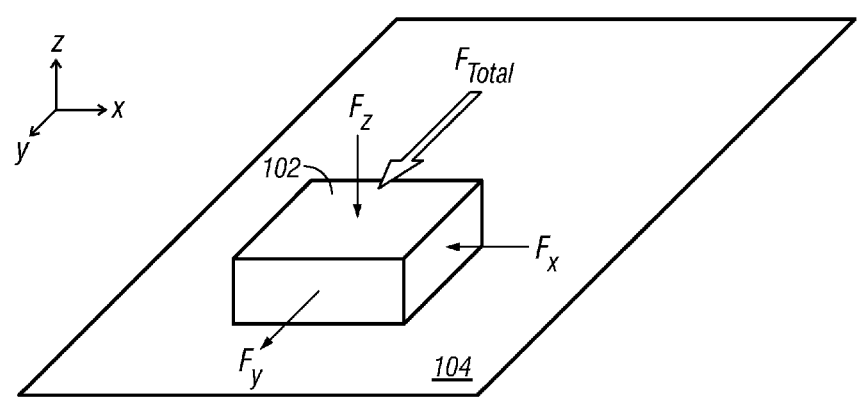
FIG. 3 is a block diagram of forces exerted on an input device according to various embodiments of this invention.

In accordance with one embodiment, directions and magnitudes of forces acting upon the input device 102 can be derived from information generated by the force sensors. FIG. 3 is a block diagram indicating a force $F_{total}$ applied to the input device 102 positioned on surface 104. As an example, the force $F_{total}$ may be applied to the input device 102 by a user to move the input device in a desired direction in a plane of motion. As used herein, a "plane of motion" can be defined as an x-y plane in a Cartesian coordinate system in which a user moves the input device 102. The x-y plane has an x-axis and a y-axis perpendicular to the x-axis. A z-axis extends perpendicularly from the x-y plane. In one embodiment, the x-y plane is parallel to the surface 104.

As depicted in FIG. 3, the force $F_{total}$ applied to the input device can comprise a lateral force component and a normal force component (the normal force can also be referred to as a vertical force). The lateral force component further includes a first lateral force component, Fx, in a direction along the x-axis, and a second lateral force, Fy, component in a direction along the y-axis. The normal force component, Fz, is in a direction along the z-axis.

The direction of the lateral force is mathematically related to the lateral force components, Fx and Fy, applied to the input device 102 in the plane of motion. This relationship can be expressed as:

$$|F|=\sqrt{(Fx^2+Fy^2)} \quad (1)$$

Where |F| is a total magnitude of the lateral force applied to the input device 102. Corresponding directional vectors can then be derived using the following expression:

$$X \text{ direction}=Fx/|F|, Y \text{ direction}=Fy/|F| \quad (2)$$

Thus, using the lateral force components, Fx and Fy, applied to the input device 102, logic residing in force detection module 220 or computer 106, for example, can estimate a total magnitude of the lateral force and corresponding directional unit vectors of the applied lateral force. Of course, other standard techniques known in physics may be used to calculate a scalar quantity of force from a given set of force vectors. In accordance with various embodiments, the logic may be implemented as any combination of software, firmware and/or hardware.

Note that in one embodiment, motion and force information can be written to a local memory source (not shown) (such as a register or local cache) before being provided as input. In other embodiments, this data can be directly written and retrieved from memory 212. In still other embodiments, this data can be stored in external memory (e.g. a hard drive of the computer 106) and the input device 102 can transmit raw data to the computer 106 for processing.

As mentioned above, one or more force sensors 222 can be utilized to generate force information pertaining to forces acting upon the input device 102. In accordance with one embodiment, the input device 102 can detect lateral components of forces applied to the input device 102 in two directions in a plane of motion of the input device; the first direction being substantially perpendicular to the second direction. Information relating to the detected lateral force components can then be used to calculate an estimated magnitude and direction of a lateral force acting upon the input device 102, among other things. A system in accordance with various embodiments can then move a navigational object based on the estimated magnitude and direction, for example.

FIGS. 4A-4D are graphs of force, acceleration, velocity and displacement, respectively, versus time of an exemplary movement of input device 102 moving in a straight line from a first point A to a second point B. Furthermore, FIGS. 4A-4D illustrate exemplary first through fifth states 401-405, respectively, of the input device 102 while it moves from point A to point B. For illustrative purposes, the following description of FIGS. 4A-4D may refer to elements mentioned above in connection with FIGS. 1-3.

Figure 4A:
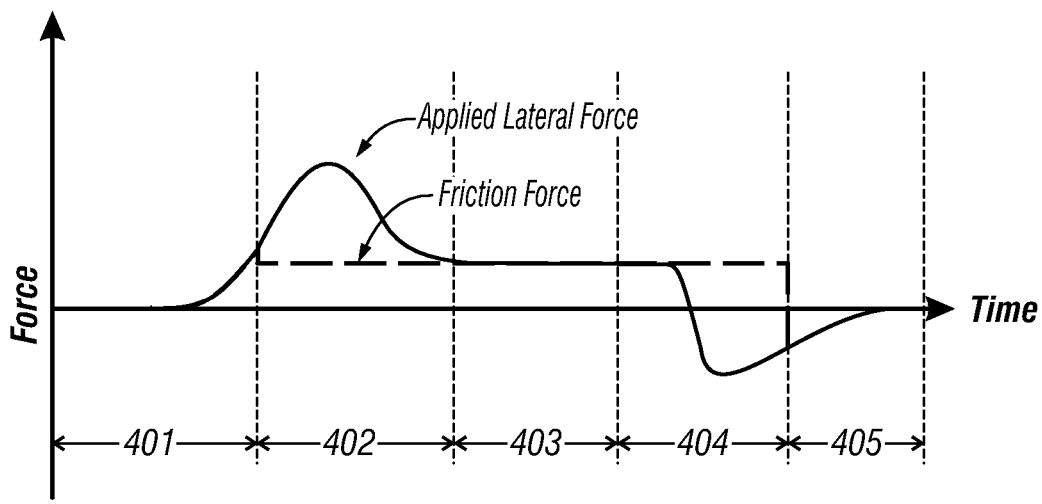
FIGS. 4A-4D are graphs of force and motion parameters of an input device moving form a first point to a second point according to various embodiments of this invention.

With particular reference to FIG. 4A, during the first state 401, a force is applied to input device 102, for example by a user, but the applied force does not exceed the static (maximum) frictional force between input device 102 and surface 104. Consequently, in the first state 401, input device 102 is not yet moving (see FIGS. 4C and 4D) despite a force being applied to the input device 102.

Figure 4B:
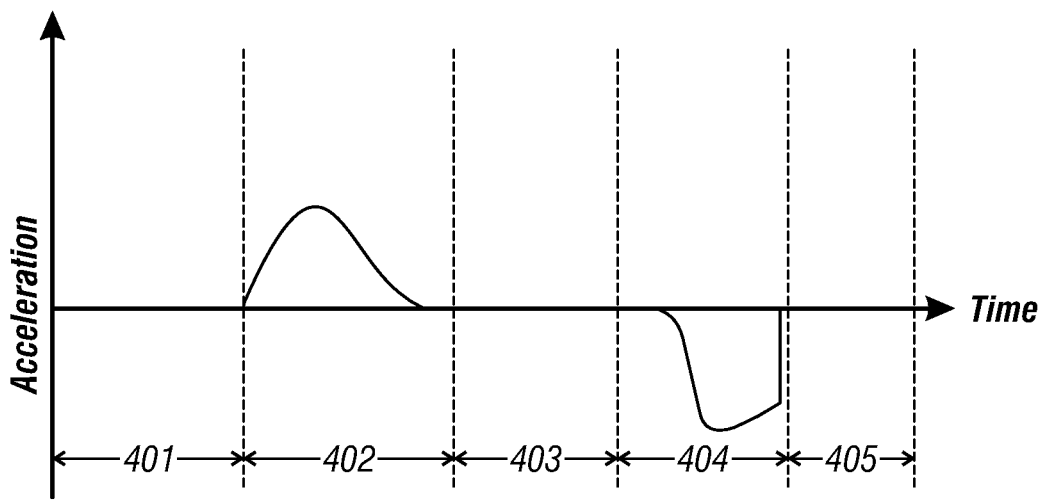
Figure 4C:
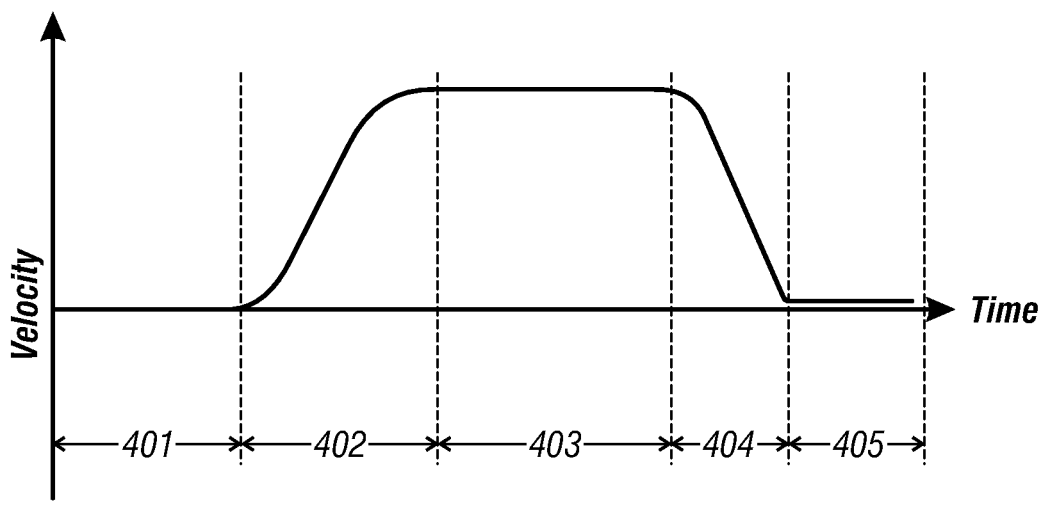
Figure 4D:
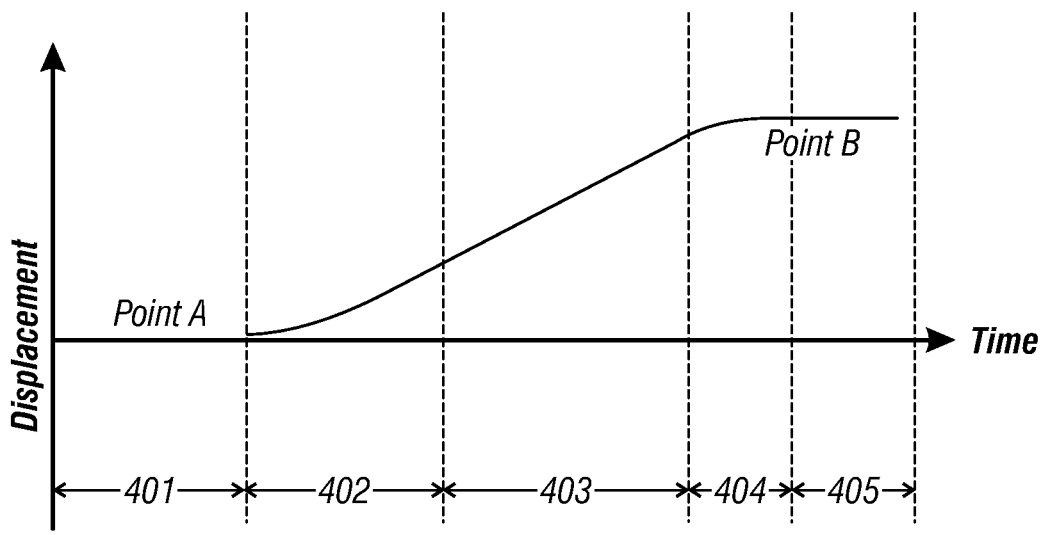

During the second state 402, the applied force exceeds the static frictional force, which results in movement of the input device 102, as illustrated in FIGS. 4A and 4D, for example. Note that in accordance with known principles of physics, the coefficient for static frictional force is typically larger than the coefficient for kinetic frictional force. As a consequence, the frictional force between the input device 102 and surface 104 typically decreases once the input device 102 begins sliding on surface 104. Hence, as depicted in FIG. 4A, the frictional force decreases at the transition between the first state 401 and the second state 402. This transition from static friction to kinetic friction can result in unstable control of the input device 102 due to what is commonly referred to as a "stick-slip" phenomenon. This phenomenon is due to a user needing to apply a force that exceeds the static friction to initiate sliding on the input device 102, which can feel like the input device 102 is "sticking" to surface 104. But once the static frictional force is exceeded, the smaller kinetic coefficient applies to the frictional force, which can cause a slip or jerk type motion due to the reduction in frictional force. This "stick-slip" phenomenon can make it difficult for a user to control an input device 102 when moving the input device a small distance, for example.

During the third state 403, the applied force is equal to the frictional force. This results in no acceleration (FIG. 4B) and a constant velocity (FIG. 4C) of the input device 102 along the plane of motion.

During the fourth state 4, the magnitude of the applied force is less than the frictional force. This results in a deceleration of the input device 102 (FIG. 4B).

Finally, during the fifth state 405, the input device 102 is stopped. In this state, the applied force no longer exceeds the static frictional force (FIG. 4A), and there is no motion (zero velocity) (FIG. 4C), no acceleration (FIG. 4B), and no change in displacement (FIG. 4D). Note that the transition between the fourth state 404 and the fifth state 405 can also result in unstable movement of the input device 102 due to the transition from kinetic friction to static friction.

In accordance with various embodiments, a system incorporating input device 102, such as the system 100 depicted in FIG. 1, for example, can determine which state 401-405 (e.g., moving or not moving) the input device 102 is in at a given time period by measuring one or more of the parameters described in FIGS. 4A-4D. Using these parameters, the system 100 determines which state the input device 102 is in and performs different actions (also referred to herein as "initiating events") depending upon the particular state. For example, while in the first and fifth states 401 and 405, a system may initiate a fine control mode where a navigational object is moved in relatively small increments (e.g., a relatively small number of pixels); whereas, while in states 402, 403 and 404, the system may initiate a coarse control mode where the navigational object is moved in relatively large increments (e.g., a larger number of pixels than in the fine control mode). Furthermore, in some embodiments, if input device 102 is in the first state 401, the detected lateral force information can be used to provide an early indication about an impending motion. The impending motion can be determined by using force information generated by the force sensors to estimate a direction of the applied force using expressions (1) and (2), for example. In another embodiment, if input device 102 is in the first state 401, a system incorporating the input device 102 can prepare the system for an impending motion of the input device 102 by waking components of the system from a sleep mode and/or increasing a data collection rate.

Figure 5:
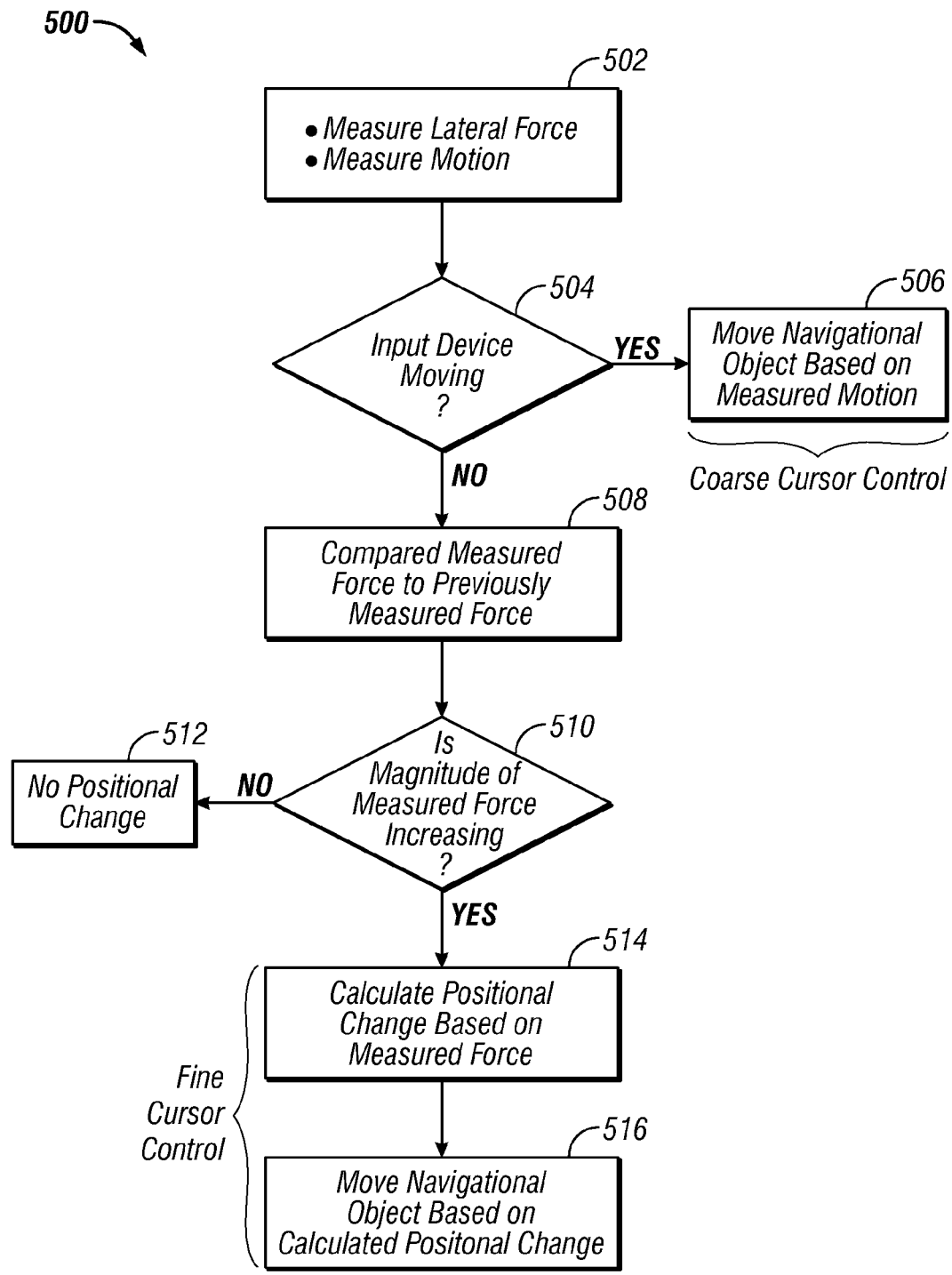
FIG. 5 is a flow diagram illustrating a process of controlling movement of a graphical object according to various embodiments of this invention.

FIG. 5 is a flow diagram illustrating an exemplary process 500 of controlling the movement of a navigational object in two modes: a fine control mode and a coarse control mode. The various tasks performed in connection with process 500 may be performed by hardware, software, firmware, or any combination thereof. It should be appreciated that process 500 may include any number of additional or alternative tasks. The tasks shown in FIG. 5 need not be performed in the illustrated order, and process 500 may be incorporated into a more comprehensive procedure or process having additional functionality not described in detail herein. For illustrative purposes, the following description of process 500 may refer to elements mentioned above in connection with FIGS. 1-4.

Process 500 begins by detecting lateral force components applied to the input device 102 (e.g., the Fx and Fy force components) and detecting motion of the input device 102 relative to surface 104, in step 502. In some embodiments, the motion is detected by one or more accelerometers, vibration sensors, optical sensors, electro-mechanical sensors, some other sensor operable to detect motion of the input device 102, or a combination thereof.

Further to step 502, process 500 can periodically detect the applied lateral forces and motion. In some embodiments, the lateral forces and motion may be measured every 8 milliseconds, but other lengths of time may be used. In addition, in some embodiments, the length of time between measurements for the lateral force and the motion need not be the same, and, moreover, the lateral force and the motion need not be measured at the same time, but instead can be measured successively.

In step 504, process 500 determines if the input device 102 is moving with respect to the surface 104 by analyzing the motion detected in step 502. Process 500 can then determine the input device 102 is moving relative to the surface 104 if the velocity is non-zero. Of course other methods of determining if the input device 102 is moving relative to the surface 104 can be used depending upon the motion parameters detected by the input device 102, as would be apparent to one skilled in the art after reading this disclosure.

If the input device 102 is moving relative to the surface 104, then a coarse control mode is initiated in step 506. In coarse control mode, an associated navigational object moves in relatively large, coarse increments based on the motion of the input device 102 measured in step 502. Alternatively, while in coarse control mode, movement of the associated navigational object can be based on the motion of the input device and also in part on the detected lateral forces exerted on the input device. In one embodiment, while in coarse control mode, the input device 102 controls movement of the navigational object in a similar manner as a conventional mouse controls movement of a navigational object.

Further to step 506, in some embodiments, the measured motion includes an acceleration measurement using one or more accelerometers. An estimated speed of input device 102 can then be calculated by integrating the acceleration. Furthermore, an estimated direction of motion can be calculated using the lateral force measurements (step 502) using expressions (1) and (2), above. An associated navigational object can then be moved based on the estimated speed and estimated direction of motion. For example, the navigational object can be moved across a graphical user interface in the estimated direction of motion with a speed that is proportional to the estimated speed. In an alternative embodiment, the estimated speed and estimated direction of motion can be used to estimate a change in position of the navigational object. These are merely a few illustrative examples and it is contemplated that other methods of moving a navigational object based on the measured motion of the input device 102 can be used in other embodiments.

If the input device is not moving relative to the surface 104 in step 504, then, in step 508, magnitudes of the lateral force components, |Fx| and |Fy|, are calculated and compared to force components derived from a prior measurement of the lateral force components. In other words, the magnitudes of successively measured lateral force components are compared to one another in step 508. Process 500 then determines whether either of the force magnitude |Fx| or |Fy| is increasing as compared to the corresponding previously measured force magnitude in decision step 510. In accordance with one embodiment, the increasing force criteria of step 510 are considered met when the most recently measured force magnitude (e.g., $|Fx_{t2}|$ or $|Fy_{t2}|$ measured at time t2) is greater than the previously measured force magnitude (e.g., $|Fx_{t1}|$ or $|Fy_{t1}|$ measured at time t1).

If neither of the lateral force magnitudes calculated in step 508 is increasing, then process 500 proceeds to step 512, where process 500 indicates that no change in position of the navigational object is to occur. In one embodiment, indicating that no change in position is to occur includes setting both a change in x position value, Δx, and a change in y position value, Δy, to zero.

On the other hand, if either of the lateral force component magnitudes |Fx| or |Fy| is increasing, then process 500 proceeds to a fine control mode in steps 514 and 516. In step 514, a change in position of the navigational object is calculated and a value for the positional change is set in memory, such as memory 212. In one embodiment, the change in position is calculated using expressions (3) and (4):

$$\Delta x = (\text{gain}) \times (\Delta Fx) \quad (3)$$

$$\Delta y = (\text{gain}) \times (\Delta Fy) \quad (4)$$

Where Δx and Δy are change in position values of the navigational object along an x-axis and a y-axis, respectively, in a Cartesian coordinate system; gain is a predetermined gain factor; ΔFx is a change in the measured lateral force component along the x-axis; and ΔFy is a change in measured lateral force component along the y-axis. The gain factor can correspond to a desired precision or granularity of moving the navigational object in the fine control mode. In some embodiments, the gain factor has a value corresponding to a total range of 1 to 100 pixels for Δx and Δy. Of course, other values for the gain factor may be used depending upon various factors, such as a desired precision, and the size and resolution of the display upon which the navigational object is displayed and moved.

In alternative embodiments, Δx and Δy are predetermined values. As an example, if the lateral force component measured along the x-axis is increasing in step 510, then the navigational object is moved in an x-direction by a number of pixels corresponding to the predetermined value of Δx. In this manner, an increasing lateral force imparted on the input device 102 results in the navigational object moving by a predetermined number of pixels.

Referring again to FIG. 5, once the change in position values, Δx and Δy, are calculated and set in step 514, the navigational object is moved based on the change in position values, Δx and Δy, in step 516.

In one embodiment, process 500 utilizes two navigational control modes: a coarse control mode when the input device 102 is moving relative to surface 104 and a fine control mode when the input device 102 is not moving relative to surface 104 but a lateral force applied to the input device 102 is increasing. In this manner, a user can move the navigational object a relatively small distance for precise targeting of an area by applying a force to the input device 102 without initiating sliding of the input device relative to the surface 104. On the other hand, when a user desires to move the navigational object a relatively large distance, for example from one side of a graphical display to another side of a graphical display, then the user can simply slide the input device 102 relative to surface 104 to cause the navigational object to quickly move the larger distance.

Process 500 can also prevent or reduce overshooting or undershooting a target area due to the unstable static/kinetic friction transition when transitioning between the first state 401 and the second state 402 and/or the fourth state 404 and the fifth state 405 (see FIGS. 4A-4D). For example, once the input device 102 is no longer moving relative to surface 104, then the process 500 switches to fine control mode, permitting a user to move the navigational object in a precise manner to the target area.

Furthermore, in process 500, the measured lateral force is used to move an associated navigational object in the fine control mode if the measured lateral force is increasing (step 510). A reason for step 510 is so that the position of the associated navigational object does not change when the force sensor returns to its "home" or "zero position". In other words, in operation, a user can move a navigational object by applying a lateral force to the input device 102. But when the user reduces or stops applying a lateral force to the input device 102, the force sensor may detect a decrease in the applied lateral force. If the detected decrease in applied lateral force is also used to move the navigational object, then the navigational object could be moved away from a targeted area as a result of the decreasing applied force. This may be undesirable in certain applications. Accordingly, in one embodiment, process 500 does not use a decrease in lateral force to move the associated navigational object. Thus, using process 500, a user can move the navigational object to a target area by applying a force to the input device 102 and not be concerned about the navigational object moving away from the target area once the user reduces or ceases to apply a force to the input device 102. However, in alternative embodiments, the navigational object can be moved based on the measured lateral force regardless of whether the measured lateral force is increasing or decreasing, since doing so may be advantageous in some applications.

In some embodiments, the transition between the two navigational modes need not be abrupt, but instead can be smooth and seamless. A mathematical formula can be used such that the fine control is dominant initially, e.g., when a user first applies a force to move the input device 102, and then the coarse control can gradually become dominant as the input device accelerates, for example.

Figure 6:
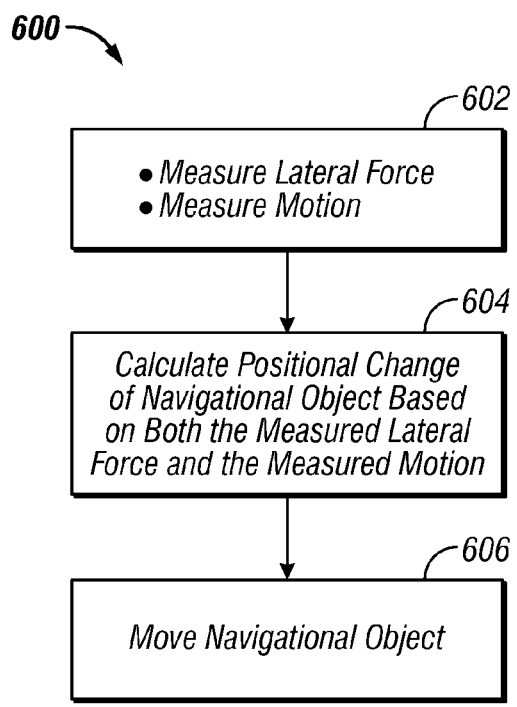
FIG. 6 is a flow diagram illustrating another process of controlling movement of a graphical object according to various embodiments of this invention.

FIG. 6 is a flow diagram illustrating a further exemplary process 600 of controlling the movement of a navigational object based on both the measured lateral force and measured motion of the input device 102, regardless of whether or not the input device is moving relative to the surface 104. The various tasks performed in connection with process 600 may be performed by hardware, software, firmware, or any combination thereof. It should be appreciated that process 600 may include any number of additional or alternative tasks. The tasks shown in FIG. 6 need not be performed in the illustrated order, and process 600 may be incorporated into a more comprehensive procedure or process having additional functionality not described in detail herein. For illustrative purposes, the following description of process 600 may refer to elements mentioned above in connection with FIGS. 1-4.

Process 600 measures the lateral force components applied to the input device 102 and the motion of the input device relative to surface 104 in step 602. In one embodiment, step 602 can be performed in a similar manner as described above with respect to step 502 of process 500.

Process 600 then calculates change in position values of the navigational object, Δx and Δy, based on both the measured force and measured motion in step 602. As an example, equations (5) and (6), below, can be used to calculate the values Δx and Δy:

$$\Delta x = \Delta Fx(\text{gain}_{force}) + m_x(\text{gain}_{movement}) \quad (5)$$

$$\Delta y = \Delta Fy(\text{gain}_{force}) + m_y(\text{gain}_{movement}) \quad (6)$$

Where Δx and Δy are a change in position of the navigational object along an x-axis and y-axis, respectively, of a Cartesian coordinate system; ΔFx and ΔFy are changes in measured lateral force components along the x-axis and y-axis of the plane of motion, respectively; $m_x$ and $m_y$ are estimated movements of the input device 102 along the x- and y-axis of the plane of motion, respectively; $\text{gain}_{force}$ is a predetermined gain factor value corresponding to a desired granularity of moving the navigational object based on lateral force applied to the input device 102; and $\text{gain}_{movement}$ is a predetermined gain factor value corresponding to a desired granularity of moving the navigational object based on the movement of the input device 102. The estimated movements, $m_x$ and $m_y$, can be an estimated speed, acceleration, change in position or other parameter pertaining to the motion of the input device 102 relative to the surface 104.

It is understood that other equations or mathematical relationships may be used in place of equations (5) and (6). For example, quadratic and/or exponential mathematical relationships may be used to calculate change in position values based on measured force and motion.

Similar to process 500, in process 600, the value of ΔFx or ΔFy is non-zero when the lateral force applied along the x-axis or y-axis is increasing. Otherwise, the value for ΔFx or ΔFy is zero, thereby resulting in no lateral force contribution to the change in position of the navigational object as set forth in equations (5) and (6). However, other embodiments may use a non-zero value for the change in lateral force, ΔFx or ΔFy, regardless of whether the lateral force is increasing or decreasing. Furthermore, in some embodiments, the value of the change in lateral force components, ΔFx or ΔFy, can be negative or positive, thereby possibly providing a negative or positive contribution to equations (5) or (6), for example.

In accordance with one embodiment, values for $gain_{force}$ and $gain_{movement}$ are selected to provide smooth and seamless transitions between the first state 401 and the second state 402 and/or the fourth state 404 and the fifth state 405 (FIGS. 4A-4D). Furthermore, the values for $gain_{force}$ and $gain_{movement}$ need not be constant. For example, mathematical formulas can be used to calculate variable force gain values and variable movement gain values based on various factors, such as a state of the input device 102 (e.g. first-fifth states 401-405, respectively) or other desired parameters.

In step 606, the navigational object is moved based on the values of Δx and Δy.

It can be noted that various functions described in processes 500 and 600 can be performed by the input device 102, the receiving device 106 or by a combination of the two devices. For example, in accordance with one embodiment, after sensors of the input device 102 detect the lateral force and motion (e.g., step 502 or step 602 in process 500 or 600, respectively), the input device 102 may generate and transmit one or more signals to the receiving device 106 indicative of the detected lateral force and motion. The receiving device 106 can then calculate the values of Δx and Δy based on the one or more signals indicative of the detected lateral force and motion. In such an embodiment, the input device 102 need not have a processor, such as processor 208 depicted in FIG. 2. In other embodiments, however, the input device 102 may calculate the values of Δx and Δy using processor 208 (FIG. 2), generate one or more signals indicative of the values of Δx and Δy, and transmit the one or more signals to the receiving device 106.

While this invention has been described in terms of several exemplary embodiments, there many possible alterations, permutations, and equivalents of these exemplary embodiments. For example, the term "computer" does not necessarily mean any particular kind of device, combination of hardware and/or software, nor should it be considered restricted to either a multi purpose or single purpose device.

It should also be noted that there are many alternative ways of implementing the methods and apparatuses of the present invention. It is therefore intended that the following appended claims be interpreted as including all such alterations, permutations, and equivalents. In addition, as used herein, the terms "computer program" and "software" can refer to any sequence of human or machine cognizable steps that are adapted to be processed by a computer. Such may be rendered in any programming language or environment including, for example, C/C++, Fortran, COBOL, PASCAL, Perl, Prolog, assembly language, scripting languages, markup languages (e.g., HTML, SGML, XML, VOXML), functional languages (e.g., APL, Erlang, Haskell, Lisp, ML, F# and Scheme), as well as object-oriented environments such as the Common Object Request Broker Architecture (CORBA), Java™ (including J2ME, Java Beans, etc.).

Moreover, terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

What is claimed is:

1. A system comprising:
    a motion-based input device having a force detection module operable to measure a lateral force applied to the input device by a user;
    a motion detection module operative to determine if the motion-based input device is moving relative to a surface;
    a processor coupled to the force detection module, the processor operable to determine a change in magnitude of the measured lateral force by comparing the measured lateral force to a previously measured applied lateral force and generate navigational object movement information based on the change in magnitude when the motion-based input device is stationary with respect to the surface; wherein
    the navigational object movement information is generated in a coarse mode only utilizing detected movement of the motion-based input device relative to the surface when the motion detection module determines that the motion-based input device is moving relative to the surface; and the navigational object movement information is generated in a fine mode only when the motion-based input device is not moving relative to the surface and the magnitude of the measured lateral force is increasing.

2. The system of claim 1, wherein the processor is further operable to generate navigational object movement information based on the detected motion.

3. The system of claim 2, wherein the motion detection module is configured to determine a speed of the input device based upon one or more sensed inputs.

4. The system of claim 1, further comprising a receiving device coupled to the processor, the receiving device operable to receive a signal indicative of the navigational object movement information from the processor.

5. The system of claim 4, further comprising a display device coupled to the receiving device for displaying a positional change of a navigational object displayed thereon in accordance with the navigational object movement information.

6. The system of claim 1, wherein the processor is incorporated in the input device.

7. The system of claim 1, wherein the processor is incorporated in a receiving device.

8. The system of claim 1, wherein the navigational movement information comprises a value representative of an increase in the measured force by a gain factor.

9. The system of claim 1, wherein generating the navigation movement information comprises a predetermined value corresponding to a number of pixels a navigational object is to be moved on a display device.

10. The system of claim 1, wherein the force detection module detects the lateral force applied to the input device in a plane in which the detected lateral force is a force that is opposed by a frictional force between the input device and the surface.

11. A method for controlling movement of a navigational object displayed on a user graphical interface, comprising:
measuring a lateral force applied to an input device by a user;
measuring whether the input device is moving relative to a surface utilizing a motion detection module;
determining a change in magnitude of the applied lateral force by comparing the applied lateral force to a previously measured applied lateral force; and
generating a control signal based on the determined change in magnitude of the applied lateral force when the input device is stationary with respect to the surface, the control signal being indicative of a change in position of a navigational object on a graphical display wherein
the control signal is generated in a coarse mode only utilizing detected movement of the input device relative to the surface when the motion detection module determines that the input device is the input device is moving relative to the surface; and
the control signal is generated in a fine mode only when the input device is not moving relative to the surface and the magnitude of the applied lateral force is increasing.

12. The method of claim 11, wherein the control signal is based on the detected movement.

13. The method of claim 12, wherein detecting the movement is performed by a one or more of an accelerometer, an optical sensor, a vibration sensor and an electro-mechanical sensor.

14. The method of claim 11, further comprising:
receiving the control signal;
displaying a navigational object at a first location on a user graphical interface; and
moving the navigational object to a second location based on the control signal.

15. The method of claim 11, wherein the lateral force applied to the input device is measured in a plane in which the measured lateral force is a force that is opposed by a frictional force between the input device and the surface.

16. A method for controlling movement of a navigational object displayed on a user graphical interface, comprising:
measuring a lateral force applied to an input device by a user;
determining a change in magnitude of the applied lateral force by comparing the applied lateral force to a previously measured applied lateral force;
measuring a motion of the input device relative to a surface utilizing a motion detection module;
determining a positional change of the navigational object based on at least one of the change in magnitude and the measured motion wherein
the positional change is determined in a coarse mode only utilizing detected motion of the input device relative to the surface when the motion detection module determines that the input device is moving relative to the surface; and
the positional change is determined in a fine mode only when the input device is not moving relative to the surface and the magnitude of the applied lateral force is increasing.

17. The method of claim 16, further comprising moving the navigational object on the user graphical interface in accordance with the positional change.

18. The method of claim 17, wherein the positional change comprises a predetermined number of pixels.

19. The method of claim 16, further comprising determining whether a magnitude of the applied lateral force is increasing, wherein the determining of the positional change is based at least in part on the change in magnitude when the magnitude of the applied lateral force is increasing.

20. The method of claim 16, wherein the lateral force applied to the input device is measured in a plane in which the measured lateral force is a force that is opposed by a frictional force between the input device and the surface.

21. A non-transitory computer readable storage medium storing computer executable instructions which, when executed by a computer, cause the computer to perform operations comprising:
measuring a lateral force applied to the input device by a user;
determining a change in magnitude of the measured lateral force by comparing the measured lateral force to a previously measured applied lateral force;
detecting a motion of the input device relative to a surface utilizing a motion detection module;
determining a detected lateral force contribution based at least in part on the measured lateral force;
determining a detected motion contribution based at least in part on the detected motion of the input device; and
calculating a change in position of the navigational object based on at least one of the change in magnitude, the detected lateral force contribution, and the detected motion contribution wherein the change in position is calculated in a coarse mode only utilizing detected movement of the motion-based input device relative to the surface when the motion detection module determines that input device is moving relative to the surface; and the change in position is calculated in a fine mode only when the input device is not moving relative to the surface and the magnitude of the applied lateral force is increasing.

22. The non-transitory computer readable storage medium of claim 21, further comprising the operations of:

determining if a magnitude of the lateral force is increasing, wherein the detected lateral force contribution is determined as zero if the magnitude of the lateral force is not increasing and the lateral force contribution is determined as non-zero if the magnitude of the lateral force is increasing.

23. The non-transitory computer readable storage medium of claim 22, further comprising the operations of:

determining if the input device is in motion relative to the surface, wherein the detected motion contribution is determined as non-zero if the input device is determined to be moving relative to the surface.

24. The non-transitory computer readable storage medium of claim 23, wherein calculating the change in position in at least one additional mode comprises adding together the detected lateral force contribution and the detected motion contribution.

25. The non-transitory computer readable storage medium of claim 21, further comprising the operations of:

calculating a movement of the input device based on the detected motion, wherein:

calculating the change in position in at least one additional mode comprises adding together a detected lateral force contribution and a detected motion contribution, determining the detected lateral force contribution based at least in part on the lateral force is based at least in part on the change in magnitude multiplied by a predetermined force gain factor, and determining the detected motion contribution based at least in part on the detected motion of the input device is based at least in part on the change in position multiplied by a predetermined movement gain factor.

26. The non-transitory computer readable storage medium of claim 25, wherein the predetermined force gain factor and the predetermined movement gain factor are selected so as to provide a smooth transition as the input device moves between a first motion state and a second motion state.

27. The non-transitory computer readable storage medium of claim 26, wherein the first motion state comprises a lateral force applied to the input device that is less than the frictional force exerted between the input device and the surface.

28. The computer readable storage medium of claim 26, wherein the second motion state comprises the input device moving relative to the surface.

29. The non-transitory computer readable storage medium of claim 21, the operations further comprising:

positioning a navigational object on a graphical display based on the navigational object movement amount.

30. The non-transitory computer readable medium of claim 21, wherein the lateral force applied to the input device is measured in a plane in which the measured lateral force is a force that is opposed by a frictional force between the input device and the surface.

31. A motion-based input device comprising:

a lateral force detection module adapted to measure a lateral force applied to the input device by a user;

a motion detection module operative to determine if the motion-based input device is moving relative to a surface;

a processor coupled to the force detection module, the processor operable to determine a change in the measured lateral force by comparing the measured lateral force with a previously measured applied lateral force and provide navigational object movement information based on the change in the measured lateral force when the motion-based input device is stationary with respect to the surface wherein the navigational object movement information is generated in a coarse mode only utilizing detected movement of the motion-based input device relative to the surface when the motion detection module determines that the motion-based input device is moving relative to a surface; and the navigational object movement information is generated in a fine mode only when the motion-based input device is not moving relative to the surface and the magnitude of the measured lateral force is increasing; and an interface module adapted to provide a signal comprising the movement information to a receiving device.

32. The device of claim 31, further comprising a motion detection module capable of generating a motion value, wherein the navigational object movement information is additionally based on the motion value in at least one additional mode.

33. The device of claim 31, wherein the receiving device comprises a display adapted to display a navigational object that moves on the display in accordance with the movement information.

34. The device of claim 31, wherein the processor is additionally operable to determine whether the measured lateral force is increasing in magnitude, and wherein the movement information comprises a change in position information based on the increase in measured lateral force if the processor determines that the measured lateral force is increasing in magnitude.

35. The motion-based input device of claim 31, wherein the lateral force detection module is adapted to measure the lateral force applied to the input device in a plane in which the measured lateral force is a force that is opposed by a frictional force between the input device and the surface.

* * * * *